United States Patent
Matsui

(10) Patent No.: US 10,191,229 B2
(45) Date of Patent: Jan. 29, 2019

(54) PLUGGABLE MECHANISM OF OPTICAL TRANSCEIVER

(71) Applicant: Sumitomo Electric Industries, Ltd., Osaka (JP)

(72) Inventor: Takashi Matsui, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/804,623

(22) Filed: Nov. 6, 2017

(65) Prior Publication Data
US 2018/0136415 A1   May 17, 2018

(30) Foreign Application Priority Data

Nov. 14, 2016   (JP) .................................. 2016-221730

(51) Int. Cl.
G02B 6/36   (2006.01)
G02B 6/38   (2006.01)
G02B 6/42   (2006.01)

(52) U.S. Cl.
CPC ......... *G02B 6/3893* (2013.01); *G02B 6/4246* (2013.01); *G02B 6/4284* (2013.01); *G02B 6/4292* (2013.01); *G02B 6/4293* (2013.01)

(58) Field of Classification Search
None
See application file for complete search history.

(56) References Cited

U.S. PATENT DOCUMENTS

| | | | |
|---|---|---|---|
| 6,786,653 B1 * | 9/2004 | Hwang | H01R 13/633 385/92 |
| 2011/0267742 A1 * | 11/2011 | Togami | G02B 6/4246 361/679.01 |
| 2015/0092327 A1 | 4/2015 | Meadowcroft | |
| 2016/0252691 A1 * | 9/2016 | Arekar | G02B 6/4261 385/92 |

* cited by examiner

*Primary Examiner* — Chris Chu
(74) *Attorney, Agent, or Firm* — Venable LLP; Michael A. Sartori; Laura G. Remus

(57) ABSTRACT

An optical transceiver that optionally exchanges between the bail and the pull-tab for disengaging the optical transceiver with the cage is disclosed. The optical transceiver provides a slider to be assembled with both of the bail and the pull-tab. The slider provides an opening common to the bail and the pull-tab, and a composite opening that includes a portion for the bail and another portion for the pull-tab. The bail, by rotating around the common opening, may induce forward and rearward motions for the slider, while, the pull-tab, by pulling and pushing, may directly cause the forward and rearward motions for the slider through the composite opening.

4 Claims, 14 Drawing Sheets

PLUGGABLE MECHANISM OF OPTICAL TRANSCEIVER

BACKGROUND OF THE INVENTION

1. Field of the Invention

The present invention relates to a pluggable mechanism of an optical transceiver.

2. Background Arts

A United States Patent Application laid open No. US2016/0252691A has disclosed an optical transceiver that provides latching/de-latching mechanism for a cage prepared on a host system. The de-latching mechanism disclosed therein provides a bail, which is attached to a slider, able to release the optical transceiver from the cage by rotating frontward and downward. Another United States Patent Application laid open No. US2015/092327A has disclosed another pluggable optical transceiver that provides a pull-tab with an exchangeable marker. The pull-tab has an area that disposes the marker therein. The pull-tab, which extrudes from a shell, may slide the slider linearly to release engagement between the pluggable optical transceiver and the cage by pulling out the pull-tab.

A pluggable optical transceiver is sometimes requested to change a bail and a pull-tab mutually. However, conventional pluggable optical transceivers only have a mono-functional arrangement of the bail and the pull-tab, and mutual replacement therebetween has been not realized.

SUMMARY OF THE INVENTION

An aspect of the present invention related to an optical transceiver that, electrically communicates with a host system by being engaged with and disengaged from a cage provided in the host system. The optical transceiver comprises a shell and a slider. The shell provides an optical receptacle in one end and an electrical plug in another end thereof. The optical receptacle receives an optical connector therein, while, the electrical plug communicates with the host system. The slider is movable between a first position and a second position along a direction connecting the optical receptacle with the electrical plug. A feature of the optical receptacle of the invention is that the slider has a composite opening assembled with both of a bail and a pull-tab, alternatively.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENT

Next, embodiment according to the present invention will be described as referring to accompanying drawings. In the description of the drawings, numerals or symbols same with or similar to each other will refer to elements same with or similar to each other without duplicating explanations.

Figure 1:
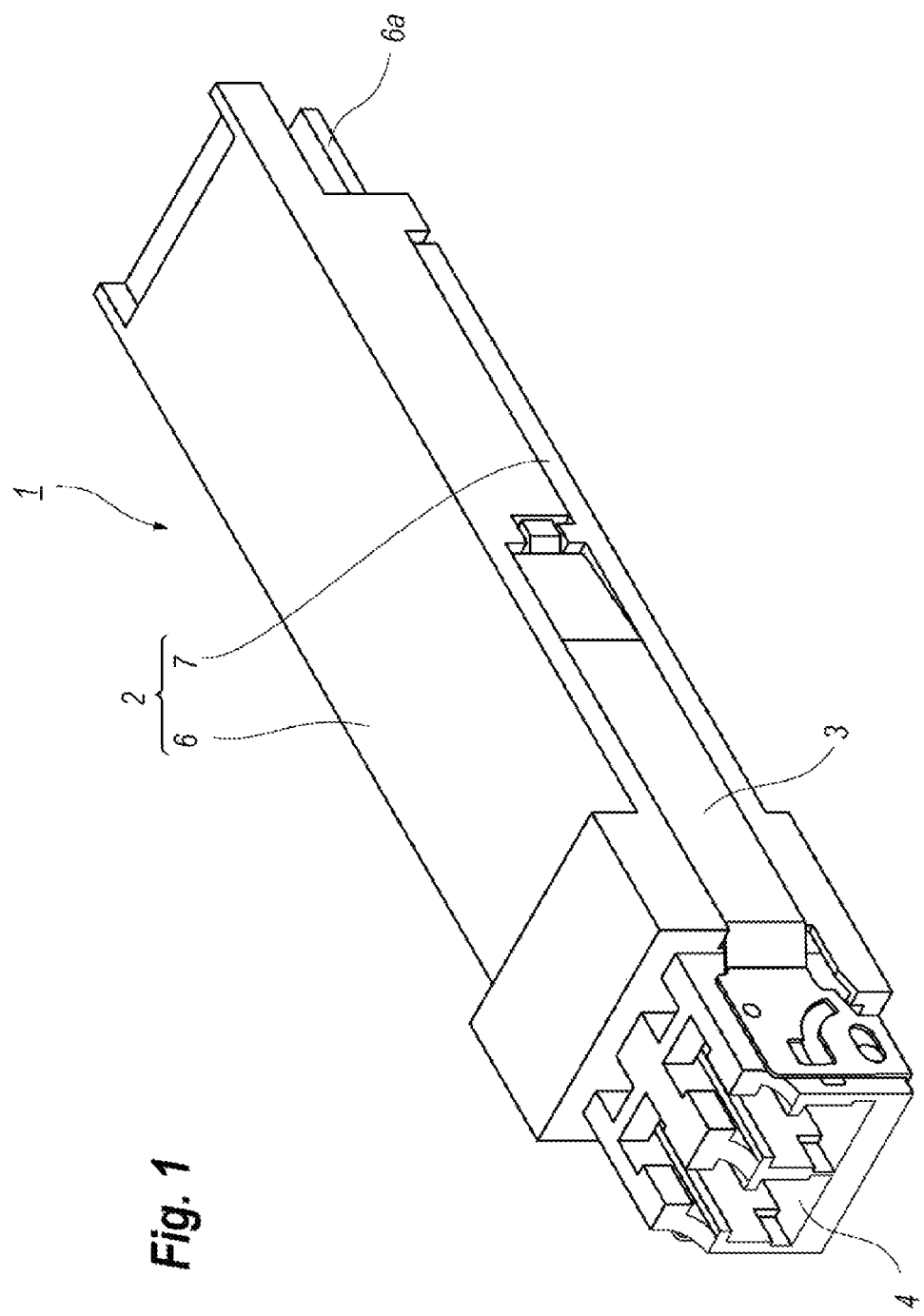
FIG. 1 is a perspective view showing an optical transceiver according to embodiment of the present invention.

FIG. 1 is a perspective view showing an optical transceiver according to embodiment of the present invention. The optical transceiver 1 is a type of, what is called as a pluggable optical transceiver plugged within a cage prepared on a host system. The optical transceiver 1 shown in FIG. 1 provides an optical receptacle 4 with two optical ports, one of which is for an optical transmission, while, another is for an optical reception. That is, the optical receptacle 4 may mate with a duplex optical connecter having a pair of optical fibers. Thus, the optical transceiver may perform the full-duplex optical communication. The optical transceiver 1 in dimensions thereof, specifications for communicating with the host system, an optical sensitivity, and so on fully follows a standard of the SFP, the small form factor pluggable, which is one of multi-source agreements defined in the field. The optical transceiver 1 provides a metal shell 2, a slider 3 that releases the engagement of the optical transceiver 1 with the cage, and the optical receptacle 4.

The shell 2, which has a box shape, encloses optical sub-assemblies, electronic circuits, and so on. The shell 2 comprises a bottom shell 6 and a top shell 7. Note that FIG. 1 shows the optical transceiver 1 in upside down. The bottom shell 6 assembles the slider therewith, while, the top shell 7 may form, accompanied with the bottom shell 6, a cavity within which optical and electrical components are enclosed. The optical receptacle 4 is provided in an end of the bottom shell 6.

The bottom shell 6 further provides an electrical plug 6a in another end thereof opposite to that providing the optical receptacle 4. Mating an external duplex optical connector with the optical receptacle 4, optical components enclosed with the shell 2 may optically couple with the optical fibers and the optical communication between the optical transceiver 1 and the optical fibers may establish. The optical transceiver 1 of the present embodiment provides the optical receptacle 4 of the type of LC receptacle. That is, the optical receptacle 4 of the embodiment fully follows the standard of the LC-connector, Lucent Connector. The description hereinafter assumes that a direction of "front" and/or "forward" corresponds to a side where the optical receptacle 4 exists, while, another direction of "rear" and/or "back" corresponds to a side where the electrical plug 6a is provided. However, these descriptions are only for explanation sake, and do not affect or narrow a scope of the present invention.

Figure 2:
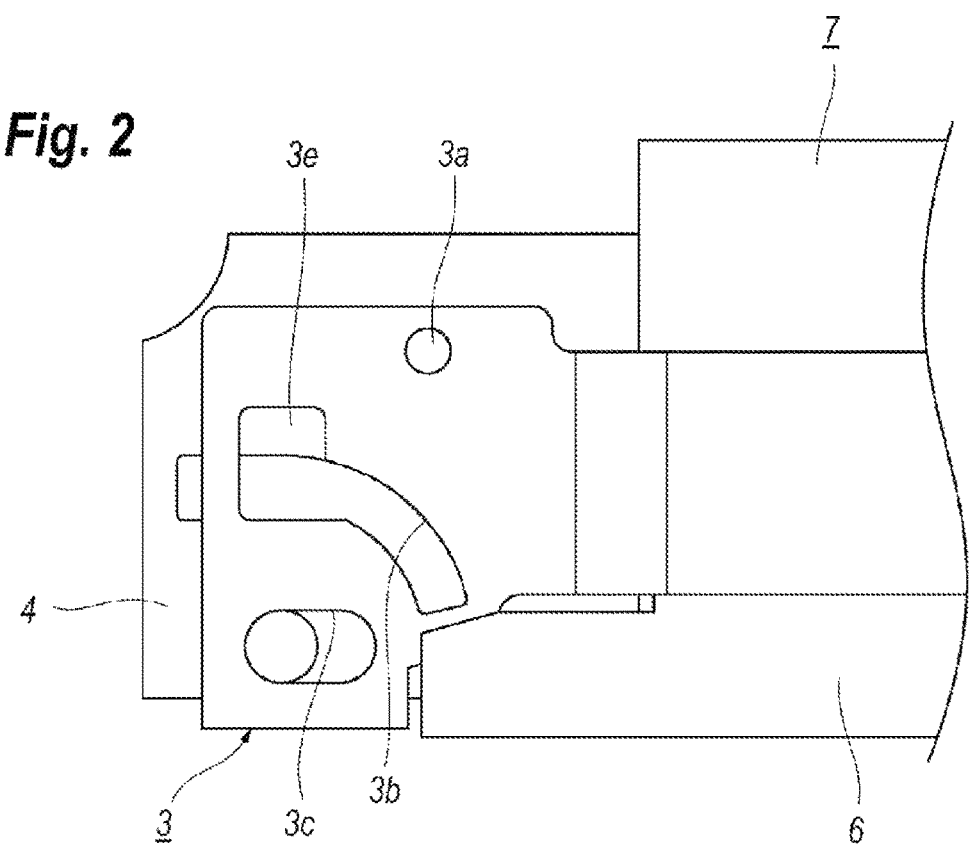
FIG. 2 is a side view of a shell, an optical receptacle, and a slider.
Figure 3:
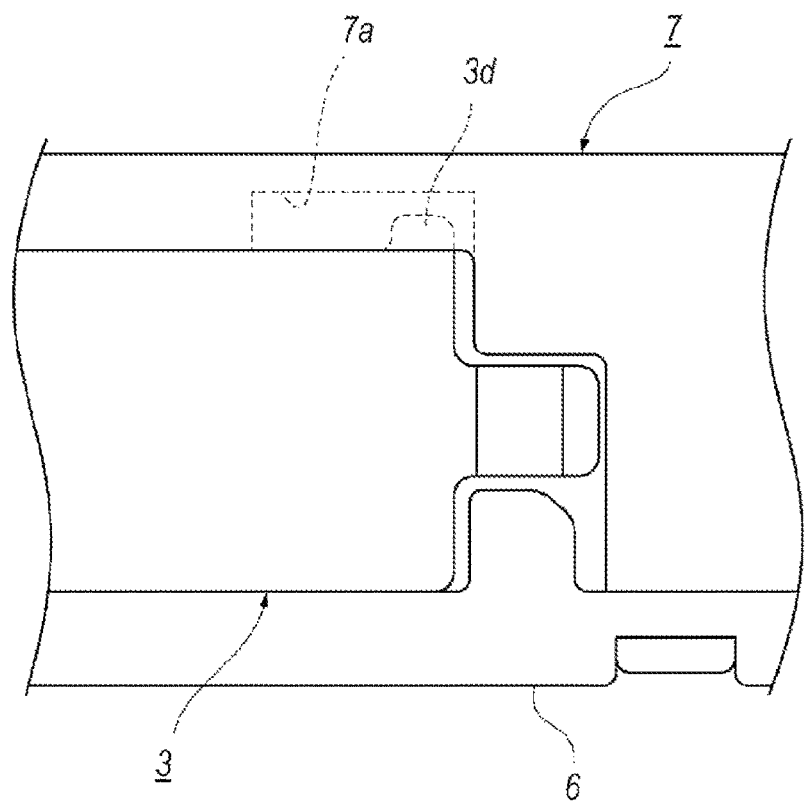
FIG. 3 is a side view of the slider, a top shell and a bottom shell.

As FIGS. 2 and 3 illustrate, the slider 3 provides a projection 3a, a composite opening includes a curved opening 3b and a square opening 3e below the projection 3a, and an elongated opening 3c below the curved opening 3b. The curved opening 3b curves frontward as advancing upward and continues the square opening 3e. The elongated opening 3c is elongated to a direction along which the optical transceiver 1 slides. Referring to FIG. 3, the slide 3 in an end thereof provides a tab extending upward and sliding within a guide 7a of the top shell 7.

Sliding the tab 3d in the guide 7a front and rear, the slider 3 may linearly slide front and rear with respect to the bottom and top shells, 6 and 7. The slider 3 positions in a rear, that is, the tab 3d positions in a rear within the guide 7a, when no action is applied thereto, and moves forward when the bail 20 or the slider 3 is actioned, that is, the tab 3d moves forward within the guide 7a. At the former status, that is the slider 3 is in the rear, the optical transceiver 1 engages with the cage, while, the optical transceiver 1 may be disengaged with, or pulled out from the cage.

Figure 4:
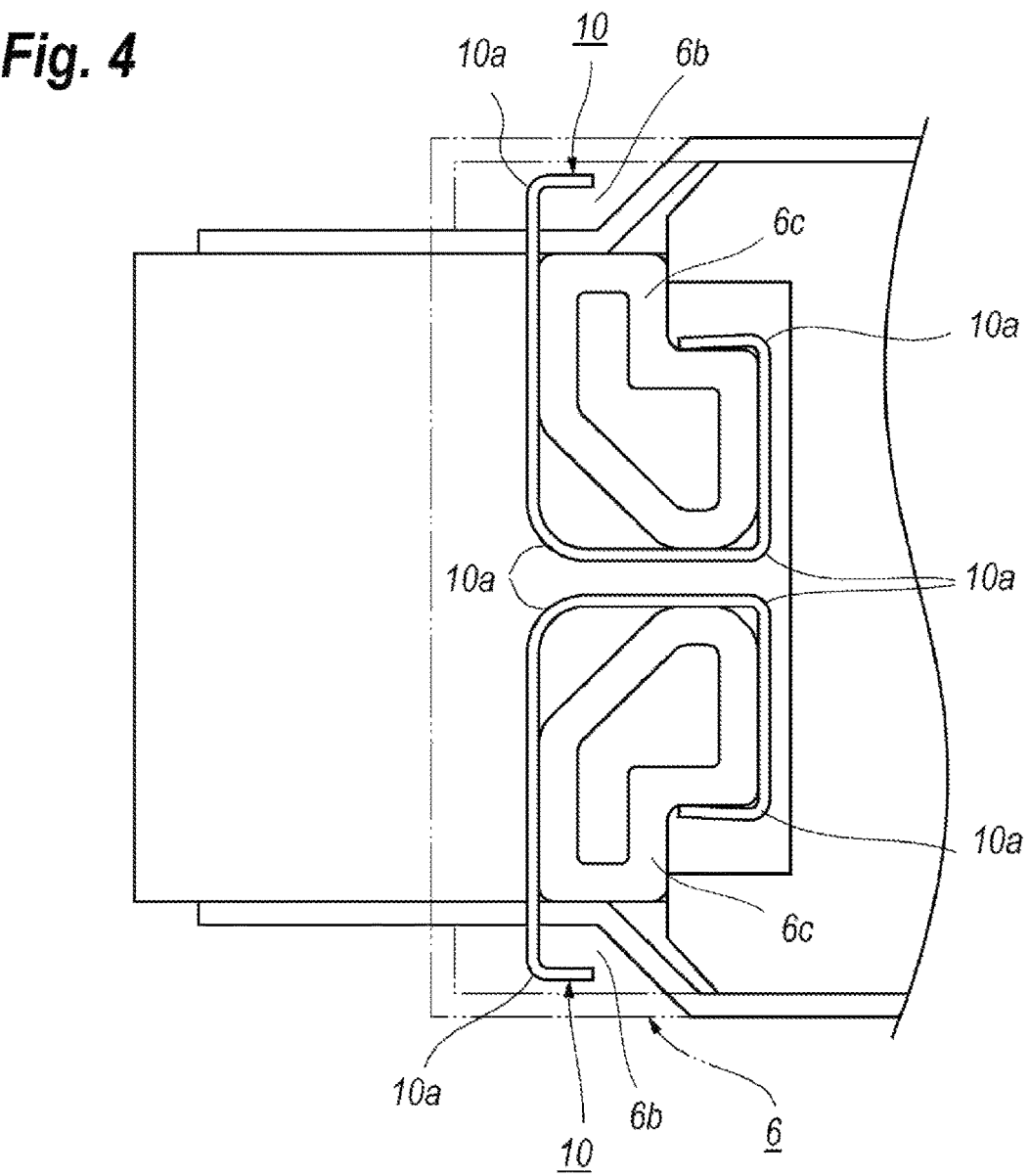
FIG. 4 is a plan view showing a spring that causes a recovery force to the slider.

FIG. 4 is a plan view showing an end of the bottom shell 6 closer to the optical receptacle 4. FIG. 4 omits the slider 3 and the optical receptacle 4. The bottom shell 6 assembles with a pair of leaf springs 10 each formed by bending a metal slab. The leaf springs 10 are set within pockets 6b in ends thereof after surrounding mesa walls 6c bent at respective bent portions 10a. The leaf springs 10 push the slider 3 rearward.

Figure 5:
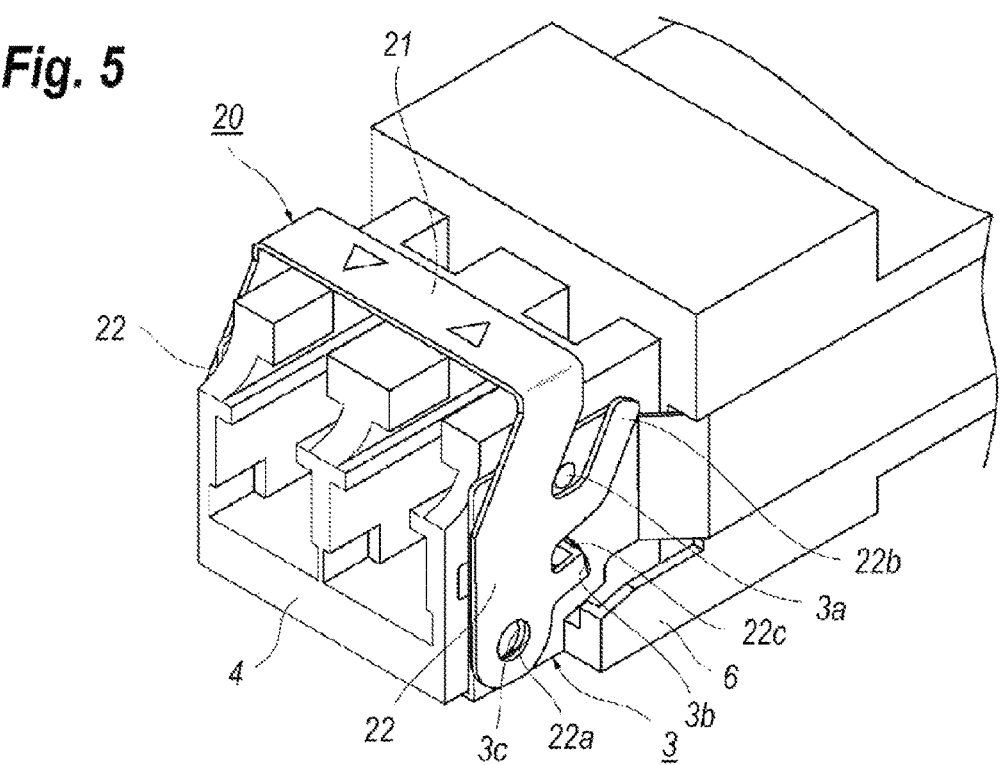
FIG. 5 is a perspective view of a bail attached to the slider.
Figure 6:
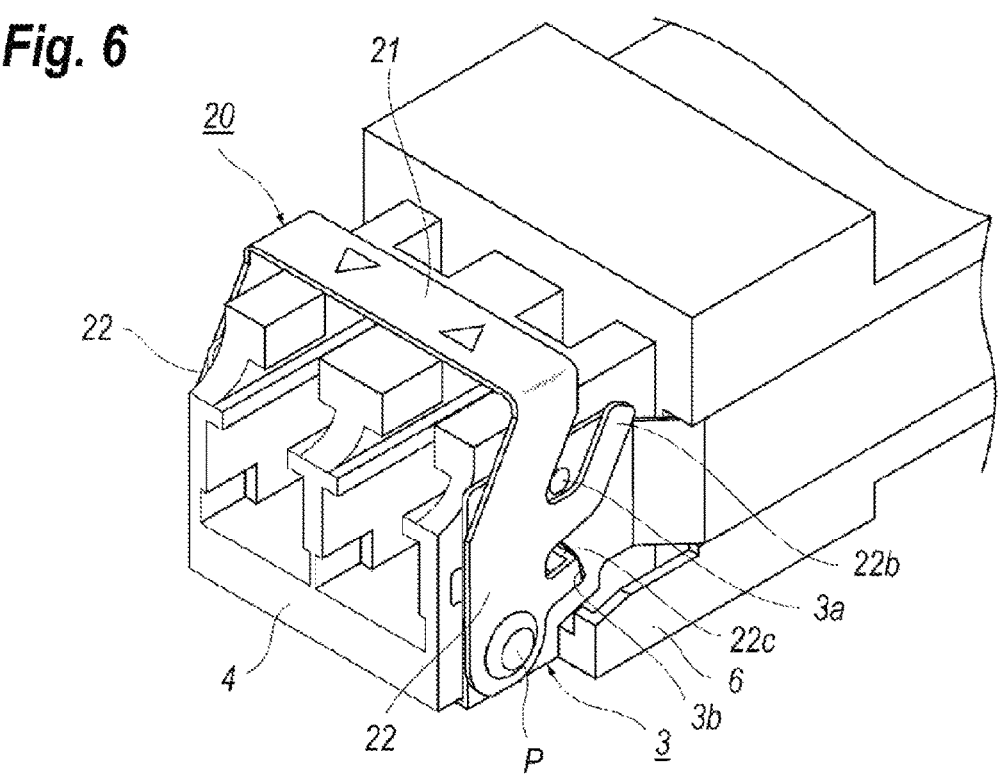
FIG. 6 is a perspective view of the bail with a pin piercing the slider and the bail.

The optical transceiver 1 of the present embodiment may optionally exchange between the bail 20 and the pull-tab 30. FIGS. 5 and 6 explain the attachment of the bail 20 with the shell 2. The bail 20, as FIGS. 5 and 6 illustrate, provides a handle 21 and legs 22 in respective ends of the handle 21. The handle 21 may bridge between the legs 22. The legs 22 are assembled with the optical receptacle 4 in respective sides thereof and rotatable such that the handle 21 crosses the front of the optical receptacle 4.

The legs 22, which extend up and down along the sides of the optical receptacle 4, each provide openings 22a in lower portions thereof, where the openings 22a receive pins P that assemble the bail 20 with the slider 3. The legs 22 further provide limbs 22b extending rearward and upward from the legs 22 and hooks 22c bent inward. The bail 20 may be assembled with the slider 3 in rotatable by aligning the openings 22a with the elongated openings 3c, positioning the limbs 22b behind the projections 3a, inserting the hooks 22c into the curved openings 3b, and inserting the pins P into the openings 22a and the elongated openings 3c. Thus, the bail 20 is assembled with the shell 2 of the optical transceiver 1.

Figure 7:
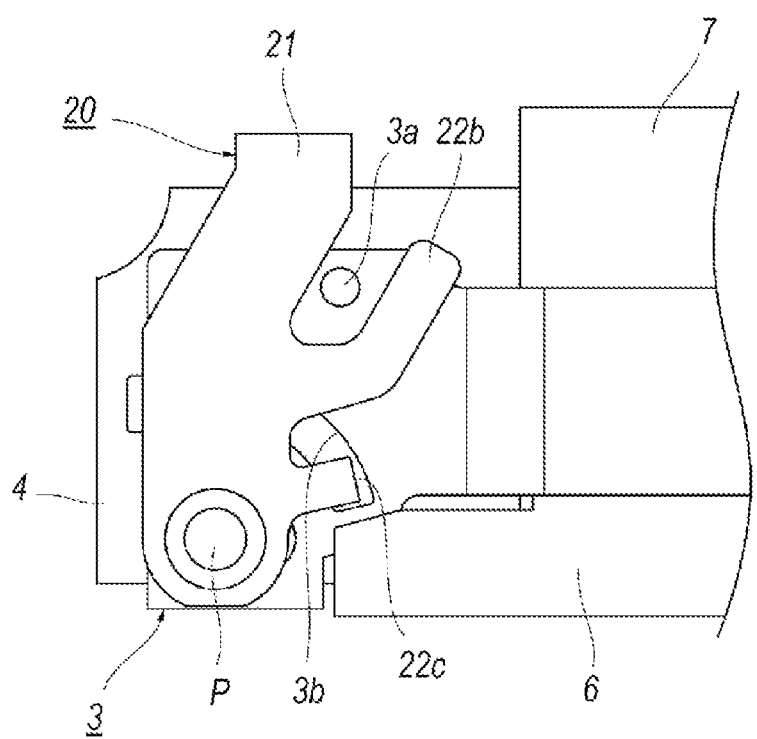
FIG. 7 is a side view of the bail assembled with the slider.
Figure 8:
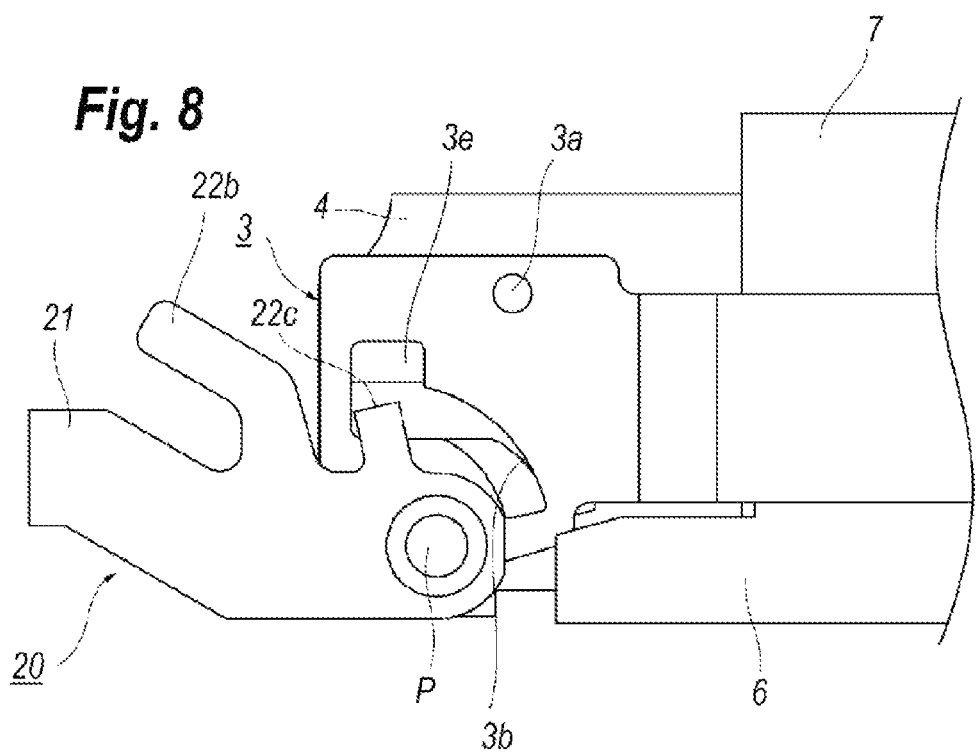
FIG. 8 is a side view of the bail rotated frontward.

As shown in FIGS. 7 and 8, moving the bail 20 in the handle 21 thereof frontward and downward from a status where the slider 3 is in the rear positions thereof, which moves the limbs 22b frontward passing the projections 3a and the hooks 22c upward and forward within the curved openings 3b, the slider 3 moves forward. Thus, the optical transceiver 1 may be pulled out from the cage of the host system. On the other hand, pulling the handle upward in front of the optical receptacle 4, the slider 3 may be pushed rearward. Further pushing the handle rearward, the limbs 22b pass the projections 3a and the hooks 22c move also rearward within the curved openings 3b; the slider 3 may recover the original position thereof.

Figure 9:
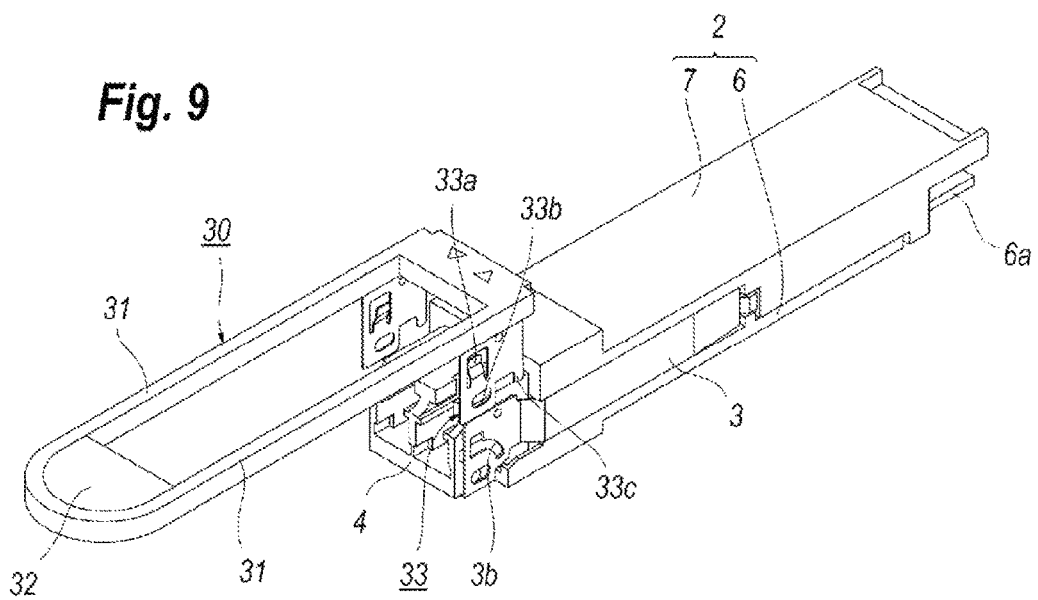
FIG. 9 is a perspective view of a pull-tab assembled with the slider.
Figure 10:
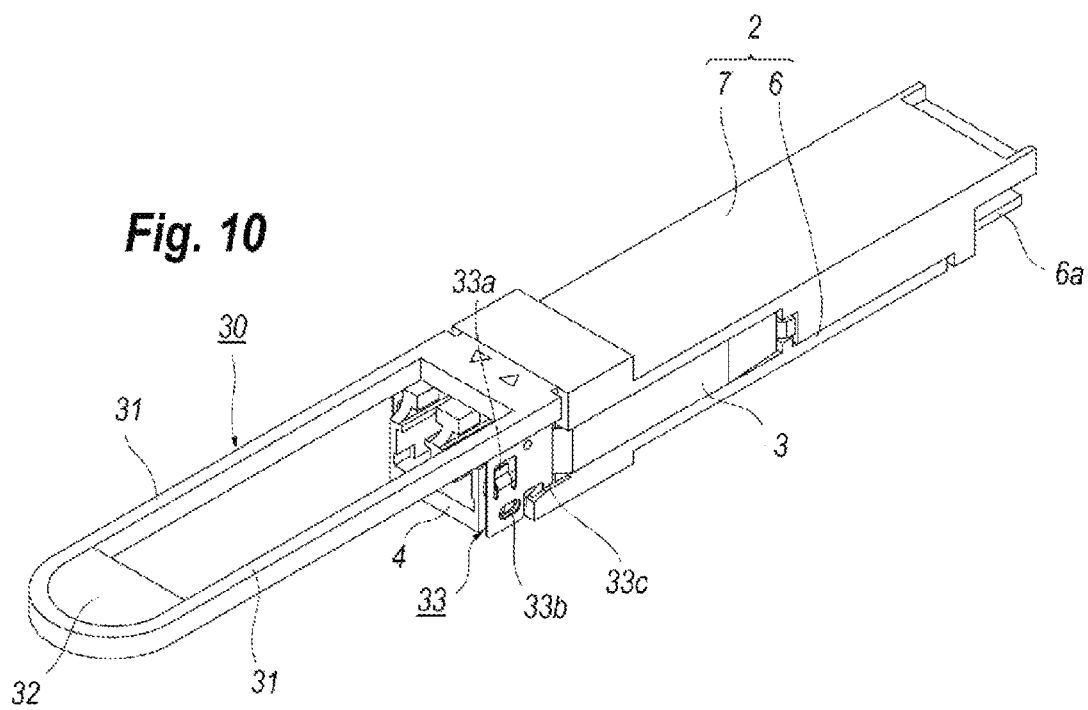
FIG. 10 is a perspective view of the optical transceiver assembling the pull-tab.
Figure 11:
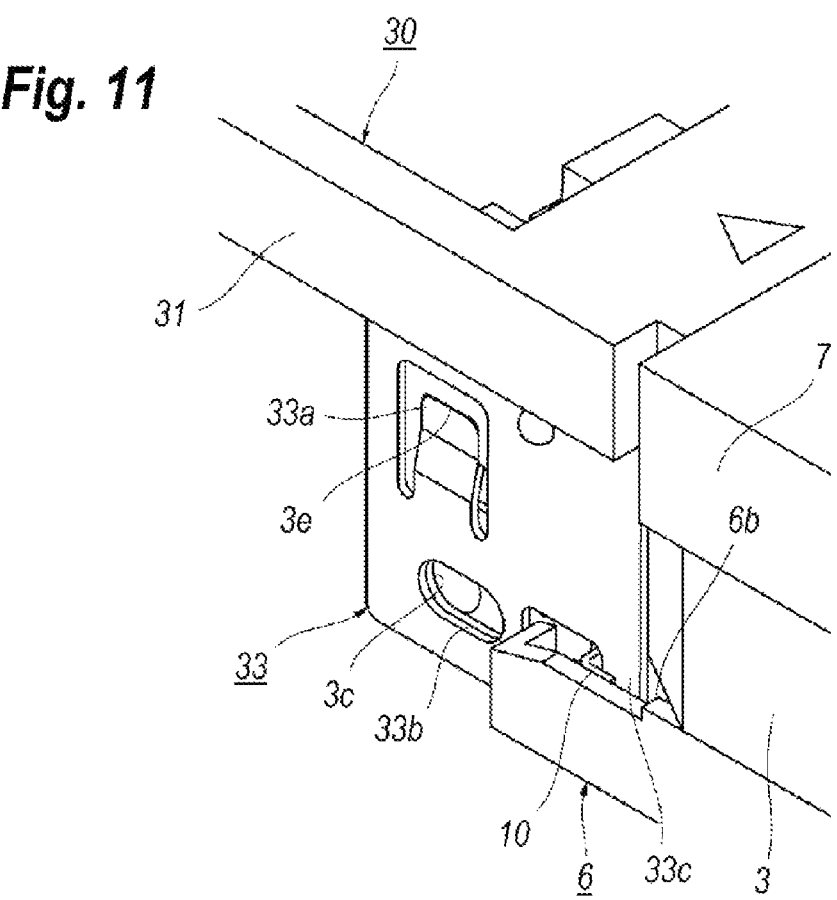
FIG. 11 is a perspective view magnifying a portion where the pull-tab is assembled with the slider, which is viewed from a rear of the optical transceiver.
Figure 12:
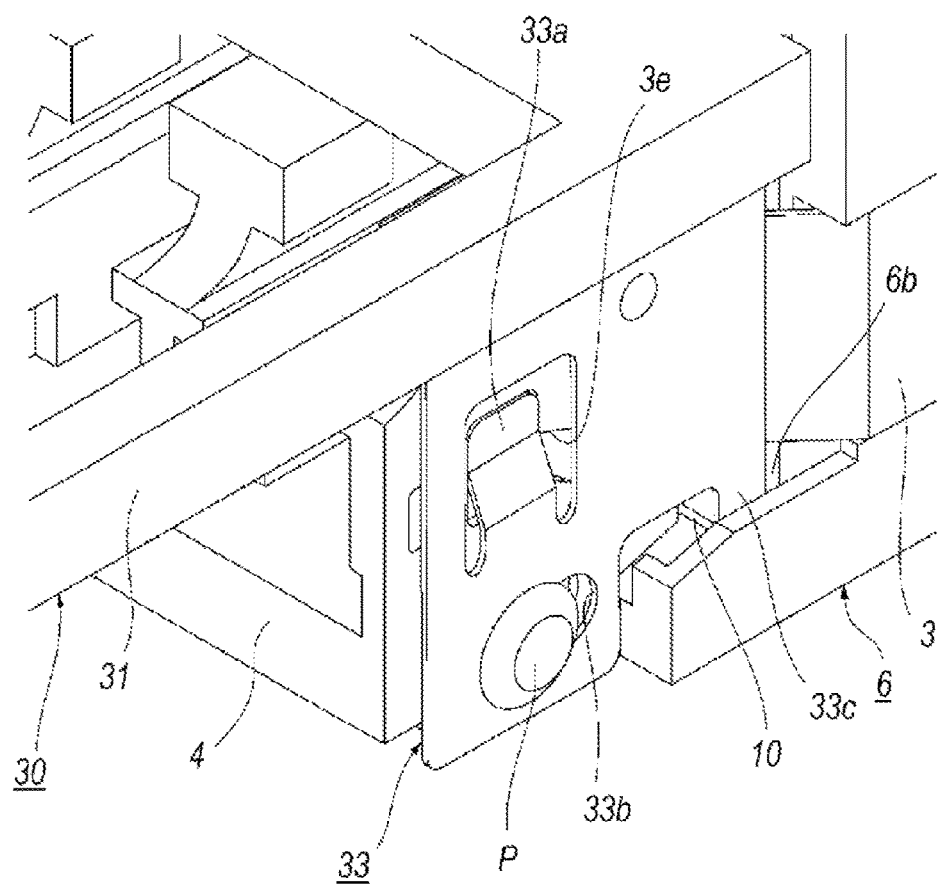
FIG. 12 is a perspective view magnifying a the pull-tab assembled with the slider viewed from a front of the optical transceiver.

FIGS. 9 and 10 explain the attachment of the pull-tab 30 with the shell 2. The pull-tab 30, which may be made of resin, includes a pair or arms 31, a handle 32 joining front ends of the arms 31, and a pair of slabs 33 in respective rear ends of the arms 31. The pull-tab 30 is assembled with the slider 3 at the slabs 33.

The slabs 33, which extend downward from the end of the arms 31, provide tabs 33a inserted within the curved openings 3b and elongated openings 33b blow the tabs 33a. The elongated openings 33b are elongated forward and rearward. The slabs 33 further provide hooks 33c in the rear ends thereof, where the hooks 33c extend downward.

The pull-tab 30 inserts the hooks 33c into the pockets 6b provided in rear portions of the leaf springs 10, and sets the tabs 33a in the front ends of the curved openings 3b, which prevents the pull-tab 30 from moving up and down, and left and right. Then, the elongated openings 33b of the pull-tab 30 may be aligned with the elongated openings 3c of the slider 3. Piercing the pull-tab 30 and the slider 3 with pins P, the slabs 33 of the pull-tab 30 may be assembled with the slider 3. Thus, the pull-tab 30 is attached to the shell 2 of the optical transceiver 1.

Figure 13:
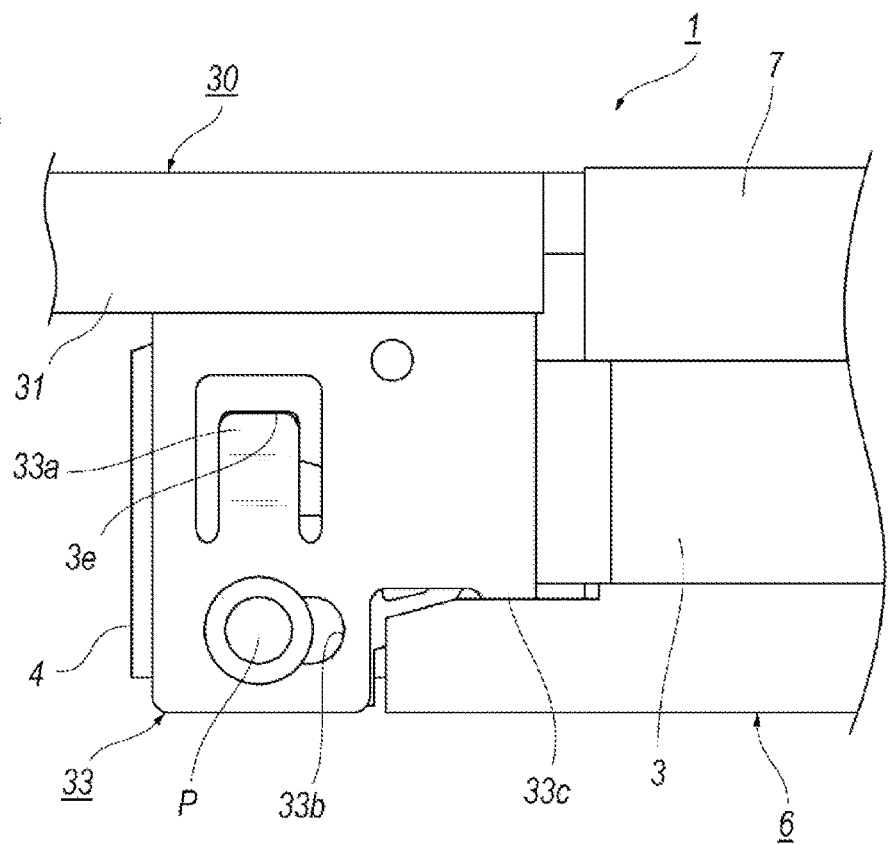
FIG. 13 is a side view of the pull-tab attached with the pin.
Figure 14:
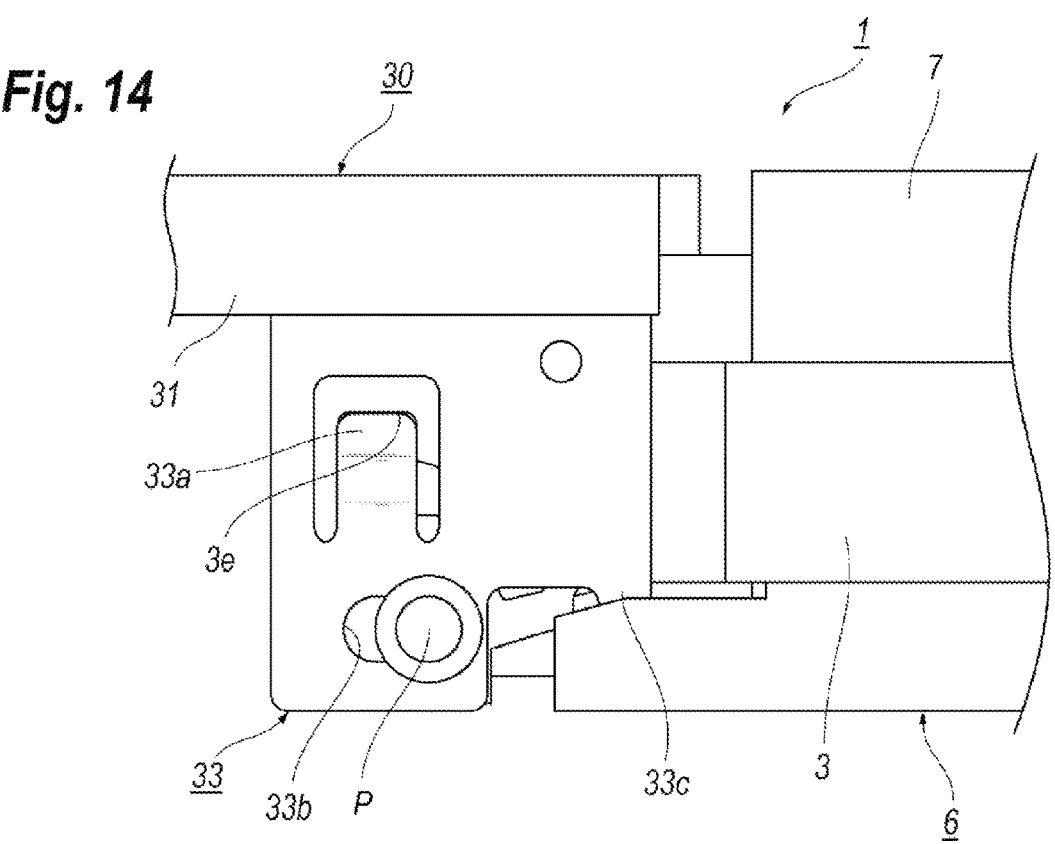
FIG. 14 is a side view of the pull-tab assembled with the slider, where the pull-tab and the slider are slid frontward.

FIGS. 13 and 14 explain the movement of the pull-tab 30 and the slider 3 caused by the pull-tab 30. Pulling the pull-tab 30 forward at a regular position thereof where the slider 3 is in the rear; the hooks 33c of the pull-tab 30 and the slider 3 move forward against the repulsive force caused by the leaf spring 10. Thus, the optical transceiver 1 may be pulled out from the cage of the host system. Releasing the pull-tab 30, the leaf spring 10 pushes the hooks 33c rearward and the slider 3 may recover the regular position thereof.

A conventional optical transceiver implementing a pull-tab is often attached to the housing of the optical transceiver by disposing in a regular position and thereafter building the bottom shell. Accordingly, in order to disassemble the pull-tab with the housing of the optical transceiver, the bottom shell is necessary to be disassembled first. Thus, even the optical transceiver may implement mechanisms to exchange between the bail and the pull-tab, the disassembly the pull-tab from the housing is complex and troublesome procedures.

The optical transceiver according to the present invention provides the slider 3 with the square openings 3e combined with the curved openings 3b, with which the hooks 22c of the bail 20 and the tabs 33a of the pull-tab 30 may easily engage. Accordingly, the bail 20 may be simply assembled with the slider 3 by engaging the hooks 22c with the curved openings 3b, while, the pull-tab 30 may be simply assembled with the slider 3 by engaging the tabs 33a with the square openings 3e.

The slider 3 may provide the elongated openings 3c through which the pins P pass when each of the bail 20 and the pull-tab 30 are assembled with the slider 3. Aligning the openings 22a of the bail 20, or the elongated openings 33b of the pull-tab 30, and passing the pins P through the openings 22a or the elongated openings 33b and the elongated openings 3c of the slider 3, one of the bail 20 and the pull-tab 30 may be assembled with the slider 3. Extracting the pins P from the openings 3c, the bail 20 or the pull-tab 30 may be easily and simply disassembled with the slider 3.

The slider 3 of the embodiment may linearly slide between the front position and the rear position, and may be engaged with the cage at the rear position. The optical transceiver 1 may further provide the leaf spring 10 that automatically sets the slider 3 in the rear position. Thus, because the slider 3 may be automatically positioned in the rear position, the optical transceiver 1 may be securely engaged with the cage of the host system. Also, the tabs 3d in the rear end of the slider 3 and movable forward and rearward within the guides 7a of the top shell 7 may prevent the slider 3 in respective rear ends thereof from being widened.

While particular embodiment of the present invention has been described herein for purposes of illustration, many modifications and changes will become apparent to those skilled in the art. Accordingly, the appended claims are intended to encompass all such modifications and changes as fall within the true spirit and scope of this invention.

The present application claims the benefit of priority of Japanese Patent Application No. 2016-221730, filed on Nov. 14, 2016, which is incorporated herein by reference.

What is claimed is:

1. An optical transceiver that electrically communicates with a host system by being engaged with and disengaged from a cage provided in the host system, the optical transceiver comprising:
   a housing providing an optical receptacle in one end and an electrical plug in another end thereof, the optical receptacle receiving an optical connector therein, the electrical plug to be engaged with the cage and
   a slider movable between a first position and a second position along a direction connecting the optical receptacle with the electrical plug, the slider having a composite opening assembled with both of a bail and a pull-tab, alternatively; and
   wherein the composite opening includes a curved opening and a square opening,
   wherein the bail provides a hook engaged with the curved opening in the slider; the hook causing a motion of the slider to be movable between the first position and the second position by sliding within the curved opening synchronizing with a rotation of the bail in front of the optical receptacle, and
   wherein the pull-tab provides a tab engaged with the square opening of the slider, the tab causing the motion of the slider to be movable between the first position and the second position synchronizing with a linear motion of the pull-tab.

2. The optical transceiver of claim 1,
   wherein the slider further includes an opening that passes a pin for assembling the bail and the pull-tab with the slider.

3. The optical transceiver of claim 1,
   further including a spring that automatically sets the slider in the first position.

4. The optical transceiver of claim 1,
   wherein the housing includes a guide and the slider include a tab in a rear end thereof; the tab being movable in the guide between the first position and the second position.

* * * * *